United States Patent [19]
Stamm et al.
[11] Patent Number: 4,523,128
[45] Date of Patent: Jun. 11, 1985

[54] REMOTE CONTROL OF DIMMABLE ELECTRONIC GAS DISCHARGE LAMP BALLASTS

[75] Inventors: Thomas A. Stamm, Chicago, Ill.; Zoltan Zansky, Roseville, Minn.
[73] Assignee: Honeywell Inc., Minneapolis, Minn.

[21] Appl. No.: 448,538
[22] Filed: Dec. 10, 1982
[51] Int. Cl.³ .......................... G05B 1/00; H05B 37/02; H05B 39/04; H05B 41/36
[52] U.S. Cl. .................................... 315/291; 315/247; 315/219; 315/225; 315/206; 315/308; 315/DIG. 4; 315/DIG. 7
[58] Field of Search .................. 315/DIG. 5, DIG. 7, 315/DIG. 2, DIG. 4, 206, 219, 307, 308, 291, 294, 247, 244, 225; 363/39, 40, 41, 44, 45, 46

[56] References Cited

U.S. PATENT DOCUMENTS 3,706,914 12/1972 Van Buren .......................... 315/291
4,064,414 12/1977 Bergeson et al. .................... 315/291
4,095,139 6/1978 Symonds et al. .................... 315/294
4,241,295 12/1980 Williams, Jr. ........................ 315/291
4,242,614 12/1980 Vatis et al. .......................... 315/291
4,251,752 2/1981 Stolz .................................... 315/247
4,359,670 11/1982 Hosaka et al. ................ 315/DIG. 4
4,388,563 6/1983 Hyltin .......................... 315/DIG. 4
4,388,567 6/1983 Yamazaki et al. ............ 315/DIG. 4
4,415,839 11/1983 Lesea .................................. 315/308

OTHER PUBLICATIONS

Gunther, Martin "Neuerungen beim Zubehor fur Lichtquellen: Elektronische Vorschaltgerate im Kommen" Licht, Jul. 8, 1981, (pp. 414–417), with translation.
Kobayashi, Hisao et al., "Electronic Energy-Saving Ballast, Superballast" Toshiba Review, No. 127, May–Jun. 1980, pp. 37–41.

*Primary Examiner*—Saxfield Chatmon
*Attorney, Agent, or Firm*—Charles G. Mersereau

[57] ABSTRACT

A remotely controlled dimming solid state ballast system for gas discharge lamps adapted to respond to external control signals is disclosed which includes the ballast itself along with integral controls for interfacing with an external addressing control system, which may be a powerline carrier system. The external control system includes a signal receiver for receiving, and recognizing remotely transmitted control signals addressed to said ballast. An output device is provided for generating an output control signal modulated in response to the control signals to provide the desired control setpoint of the lamps controlled by the ballast or to turn the lamps on or off.

29 Claims, 3 Drawing Figures

REMOTE CONTROL OF DIMMABLE ELECTRONIC GAS DISCHARGE LAMP BALLASTS

CROSS REFERENCE TO CO-PENDING APPLICATIONS

Cross-reference is made to a related application of Zoltan Zansky, a co-inventor in the present application, Ser. No. 448,539 entitled "Dimmable Electronic Gas Discharge Lamp Ballast", filed of even date and assigned to the same assignee as the present application. That application concerns a two-wire, high frequency dimmable electronic ballast for powering gas discharge lamps which achieves substantially a unit power factor and greatly reduces power supply current harmonics in a simplified, low-cost manner. The present invention relates to a remotely addressable high frequency electronic dimming ballast which uses a remote, possibly powerline carrier signalling system to control light level and ON-OFF status.

BACKGROUND OF THE INVENTION

1. Field of the Invention

The present invention relates generally to the field of two-wire, high frequency dimmable electronic ballasts for powering gas discharge lamps and the like and, more particularly, to a ballast system capable of being remotely addressed for light level control without the need of any additional wires to the main power supply leads to the ballast.

2. Description of the Prior Art

Solid-state electronic dimming ballast for supplying power to fluorescent or other types of gas discharge lamps are known in the prior art. These ballasts provide the same primary function as the conventional 50–60 hz heavy core-coil ballasts which have been used for many years. The solid-state ballasts normally convert conventional 50–60 hz AC to DC and then invert the DC to drive the lamps at a much higher frequency. That frequency generally is in the 10 to 50 KHz range. It has been found that flourescent lamps, for example, which are operated at these higher frequencies have a much higher energy efficiency than those operated at 60 hz and they exhibit lower power losses and longer lamp life. In addition, at high frequencies, annoying flickering and ballast hum associated with 50 or 60 Hertz systems are substantially reduced.

Because of the increase in the cost of electric power generally, there exists a rising concern for achieving higher energy efficiency in electric lighting. Most large commercial and public buildings employ numerous, sometimes thousands, of high energy discharge lamps such as fluorescent lamps to provide lighting for large square footage areas, offices and the like. More and more of these buildings are utilizing remote, centralized systems for controlling individual remote functions throughout the building such as the temperature of individual offices or rooms, locking and unlocking of numerous doors, intrusion detection, detection of fire and smoke, and such other functions as controlling individual loads during power load-shedding intervals. In such systems, normally, a centralized control station which may include a computer or other data processing system is utilized to address remote locations by means of a signalling system utilizing radio frequency, ultrasonics or a powerline carrier communication system which uses the existing building electrical network.

Insofar as application of such systems to electronic dimming ballasts is concerned, the prior art has normally depended on individual SCR controllers to modulate the average voltage supplied from the main powerline source to each individual ballast to, in turn, modulate the lamp output. Alternate systems have utilized additional low voltage wiring, for example, to supply a control signal to the ballast to turn it on and off and for dimming. Addressing could be accomplished by the SCR-controller or by the separately run control wires.

The problems associated with addressing a large number of such systems in an installation without the necessity of adding additional wiring or other control means have not been solved by the prior art. Thus, the need for a remotely addressing control system which does not require additional wiring and can achieve the desired control inexpensively has existed for some time.

SUMMARY OF THE INVENTION

By means of the present invention there is provided an integrated system for controlling flourescent lamp light output which is responsive to remote signalling and may be addressed as by powerline carrier, radio frequency, ultrasonic or other common communication systems. The system not only can be used to turn lamps ON and OFF, but can also be used to accomplish essentially full-range dimming or adjustment of the light output level.

The preferred embodiment includes a powerline carrier receiver with a unique address for receiving and decoding binary PLC messages. A digital to analog conversion system provides an analog control output which is utilized as the lamp control setpoint for modulating light level. Control is achieved by controlling the pulse width of a pulse width modulated inverter input via a summation feedback loop. The feedback signal is taken from the lamp current by means of an AC-current-to-DC-level converter. The setpoint and inverted feedback signals are summed at a summing junction and the error signal is amplified and used to adjust the pulse width of the inverter drive system. ON-OFF analog signals are also provided to turn the ballast ON and OFF.

While lamp current is a reliable and inexpensive indication of lamp brightness, and is the preferred measurement to be used, other methods such as optical feedback from a photocell, or the like, are also contemplated. In addition, although powerline carrier (PLC) is the preferred mode of addressing the system for external control, other modes such as radio frequency, ultrasonics, visible or infrared light couplings or the like may also be used.

BRIEF DESCRIPTION OF THE DRAWINGS

In the drawings wherein like numerals are utilized to designate like parts throughout the same.

DESCRIPTION OF THE PREFERRED EMBODIMENT

Figure 1:
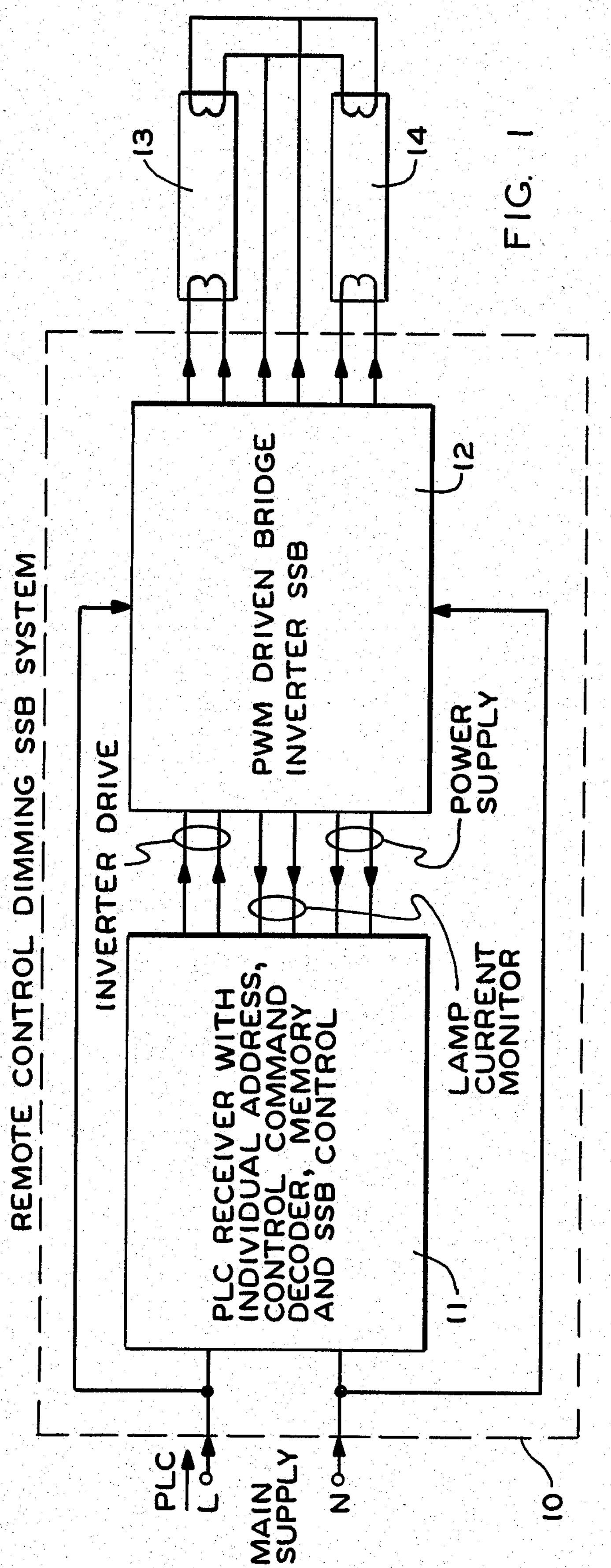
FIG. 1 is a block diagram of an electronic ballast in accordance with the invention.

FIG. 1 shows a general block diagram of the remotely controlled electronic dimming ballast system of the invention enclosed by the dashed line 10. The system includes a control function subsystem 11, a ballast subsystem 12 and a load which comprises fluorescent lamps 13 and 14.

Figure 2:
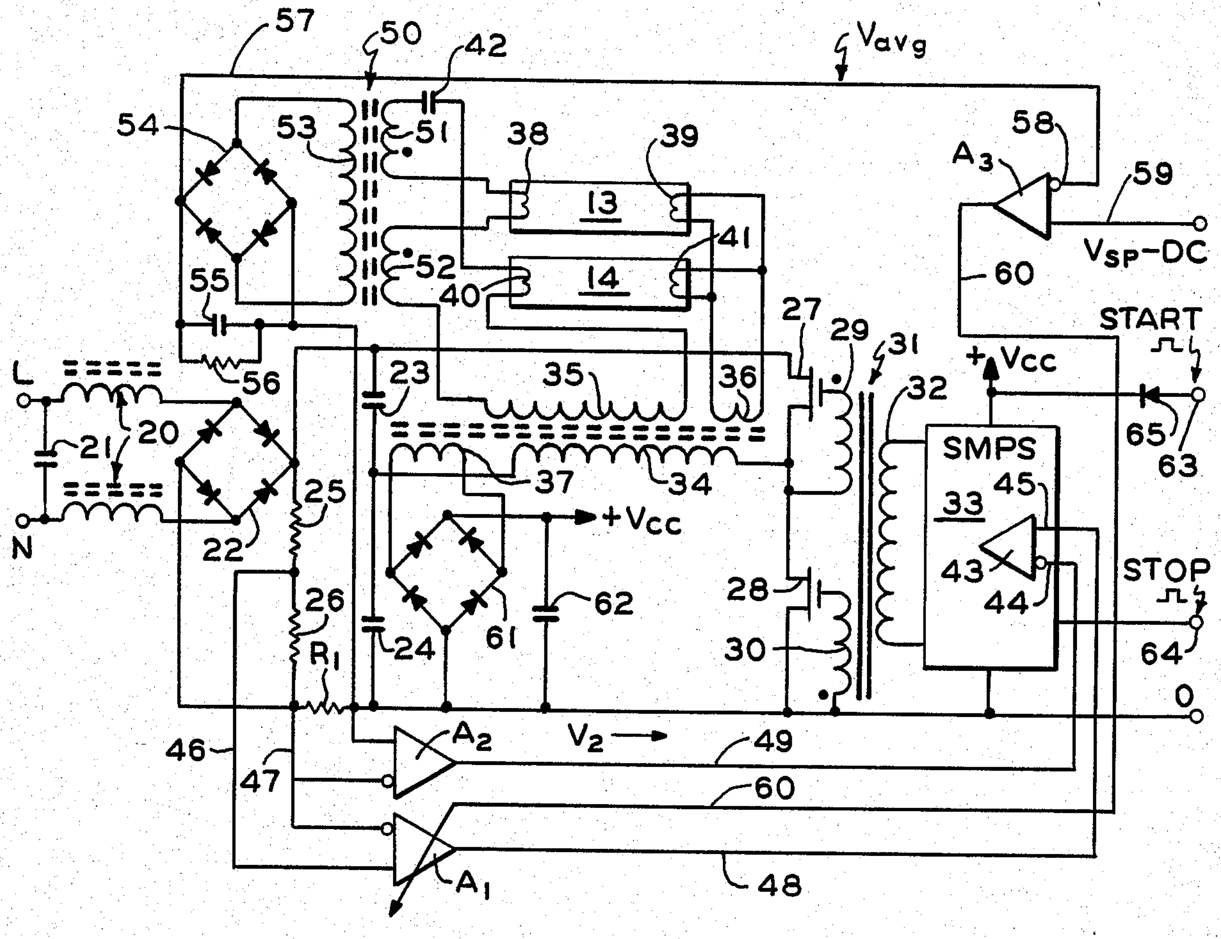
FIG. 2 is a schematic circuit diagram system of the ballast in accordance with the invention.

The ballast and lamp subsystems including a lamp current sensing system are shown in greater detail in FIG. 2. A small RFI suppression system including choke 20 and capacitor 21 is provided through which the AC main supply may be fed with no appreciable 60 Hz voltage drop or power loss. The apparatus further includes a full-wave rectifier bridge 22 and two small (approximately 1.0 mfd) filter capacitors 23 and 24. The capacitors characteristically act as a shunt with respect to all the high frequency components, e.g., above 20 kHz without having any appreciable filtering effect on the 120 hz pulse frequency of the full wave rectified 60 Hz power input from the bridge 22. Resistors 25 and 26 are provided for voltage dividing.

The half-bridge inverter includes switching transistors 27 and 28 which may be power MOSFETS or other such well-known semiconductor switches as would occur to those skilled in the art. The MOSFETS are driven with high frequency pulse width modulated voltage via secondary windings 29 and 30 of transformer 31. Pulse width modulated voltage is supplied to the primary winding 32 as from a switch mode power supply (SMPS) integrated circuit 33 which may be, for example, a SG3525 manufactured by Silicon General Corporation, Garden Grove, Calif.

The output of the inverter is substantially sinusoidal and supplies input power to the primary winding 34 of the main ballast transformer. The winding 34 is connected between the rectified RFI - filtered input voltage at the juncture of capacitors 23 and 24 and the juncture between the source of FET 27 and the drain of FET 28 such that the full sinewave current is provided through the main secondary winding 35 and auxiliary secondary windings 36 and 37. The secondaries 35 and 36 are used to power fluorescent tube 13 having filaments 38 and 39 and fluorescent tube 14 having filaments 40 and 41. The auxiliary secondary winding 36 is connected across filaments 39 and 41 of the respective tubes 13 and 14. The distances between the primary transformer winding 34, main secondary winding 35 and auxiliary secondary winding 36 are made such that the leakage inductance of the transformer is utilized to maintain an essentially constant voltage at the lamp elements despite changes in the primary winding input voltage which are employed to produce modulation of the brightness of the lamps. A further tuning capacitor 42 is provided which also protects circuit components from over voltage due to removal of one or both of the tubes 13 and 14 during operation of the system.

The operation of the SMPS integrated circuit 33 is well known to those skilled in the art. It contains an operational amplifier depicted at 43 characteristically having one inverting input 44 and one non-inverting input 45. These inputs are connected to two signals. The inverting signal is provided through a variable gain operational amplifier-multiplier $A_1$, which signal is linearly proportional to the full wave rectified but substantially unfiltered main supply voltage from the output of the full wave bridge 22 via conductors 46 and 47. This signal on conductor 48 may be denoted as $K_1V_1A_1$ where $K_1$ is a constant, $V_1$ is the momentary value of the main supply voltage and $A_1$ is the value of the variable gain of the operational amplifier-multiplier $A_1$ at that instant. The other signal is a voltage signal which is linearly proportional to the input line current through the resistor $R_1$ as amplified by the operational amplifier $A_2$. In this manner the output $V_2$ of amplifier $A_2$ can be expressed as $V_2=iR_1A_2$ where i is the current through the resistor $R_1$ and $A_2$ is the gain of the operational amplifier $A_2$. This signal is conducted on line 49 to the input 44.

In this manner a continuous signal linearly proportional to the instantaneous value of the full-wave rectified unfiltered main supply voltage is compared as an inverted signal with a continuous signal linearly proportional to the instantaneous value of the input line current by the operational amplifier 43 of the SMPS IC 33. The SMPS IC also controls the pulse width of the PWM voltage supplied to the transformer 31 and, in turn, to the half-bridge inverter. Thus, when the current of the input line is not coincident in phase and/or in the same shape as the input main supply voltage which has been full-wave rectified, there will be an error voltage signal at the input of the operational amplifier 43. This error signal will cause the SMPS IC to immediately, instantaneously modulate the pulse width of the input to the transformer 31 to correct the inverter output so that the current it draws from the main supply which is monitored by $A_2$ through $R_1$ will immediately change shape to match that of the monitored, full-wave rectified voltage across resistor 26. The continuous monitoring and updating of the voltage/current relationship enables the suppression of abberations in the input current due to the generation of harmonics and the like and enables the system to approach a unity power factor.

Controlled dimming of the fluorescent tubes 13 and 14 is accomplished in conjunction with the system of FIG. 3, discussed below, and is preferrably implemented in the ballast itself in the following manner. The average value of the fluorescent lamp current is sensed via a sensing circuit including a current transformer 50 having oppositely wound dual primary windings 51 and 52 and secondary winding 53, a full-wave rectifier 54, capacitor 55 and resistor 56.

It will be appreciated that the average lamp current is proportional to the average DC voltage ($V_{avg}$) on line 57, and this is also proportional to the average light output of the fluorescent lamps. This relationship enables close control of the dimming of the lamps using a reliable and inexpensive technique. This $V_{avg}$ signal is fed via conductor 57 to the inverting input 58 of an operational amplifier $A_3$ where it is compared with an externally controlled DC voltage setpoint control signal input 59 which is an analog signal which may represent a remotely controlled signal as will be discussed in greater detail with reference to FIG. 3. If and when the lamp current proportional DC voltage, $V_{avg}$, differs from the setpoint voltage, $V_{sp}$, a level difference or error signal is generated by the amplifier $A_3$ which in turn immediately and proportionately alters the gain of the operational amplifier-multiplier $A_1$ via a gain control line 60. This, in turn, alters the output of the amplifier $A_1$ fed to amplifier 43 in the SMPS IC affecting its PWM output to the inverter. In this manner, the average value of the pulse width modulated output power from the inverter to the fluorescent lamps, and thus the output light level, will change to match the desired setpoint. The sensed voltage error between the setpoint VSP at line 59 and $V_{avg}$ on line 57 is eliminated and the lamp output controlled at the desired level.

Other DC voltage $V_{cc}$ as is needed by the system may be conventionally supplied internally as by full wave rectifier 61 in conjunction with secondary coil 37 and filter capacitor 62. Start and Stop inputs are illustrated at 63 and 64. In operation during startup a "start" signal, normally a DC input at 63 is applied momentarily through diode 65 to the $V_{cc}$ input of the SMPS IC. This provides a momentary power supply for the SMPS IC which starts operating in its normal mode. This also allows a rectified DC voltage to be available at the $V_{cc}$ output of the rectifier 61 which will continue to supply DC power to the control SMPS IC in a "bootstrap" manner. Similarly, the system can be turned off by the application of a similar voltage as of a "stop" signal at 64 which will stop the oscillation by applying a momentary voltage at the stop input of the IC. This signal will shut the inverter down according to the operation of the SMPS IC in a well-known manner.

In accordance with the present invention, the level of brightness of the lamps is controllable over a wide range of dimming (approximately 100% to as low as 5% lumen output) along with the ON and OFF functions, which may be externally directed as by a building automation system.

Figure 3:
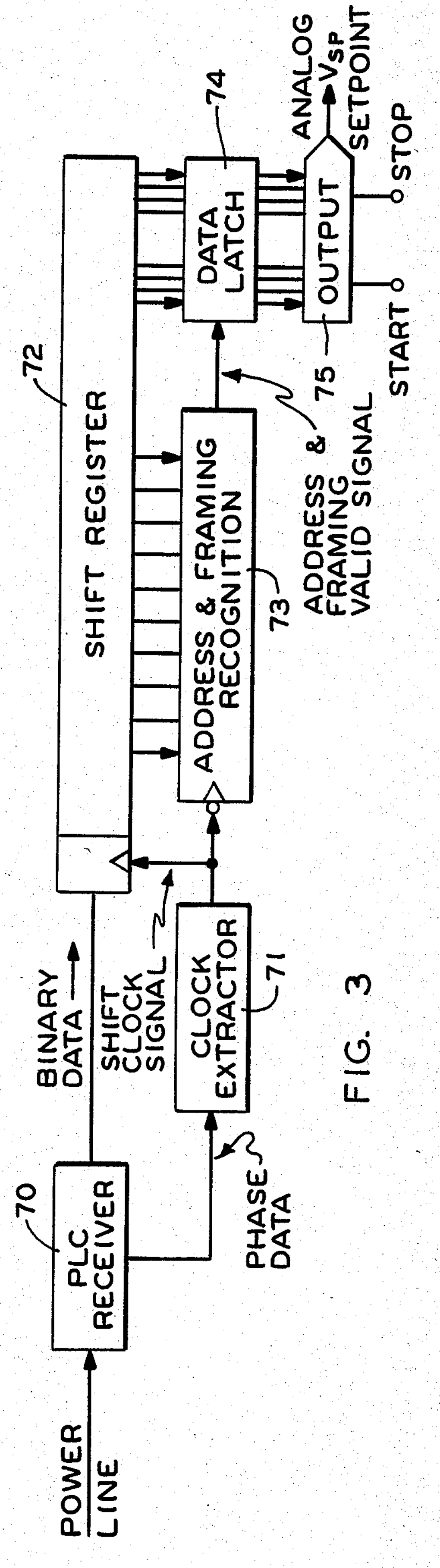
FIG. 3 is a block diagram of the ballast control system in accordance with the present invention.

As shown in FIG. 3 the use of the start and stop input signals and the variable dimming control signal $V_{sp}$ enables the system of the solid-state ballast of the invention to be remotely addressed by any compatible system such as a power line carrier addressing system. The powerline carrier remote ballast control system of the preferred embodiment includes a powerline carrier (PLC) receiver 70, a clock extractor 71, which controls the operation of a shift register 72, and an address and framing recognition apparatus 73. Data latch 74 and a digital-to-analog output device are also provided.

In operation, the powerline carrier signal is received by the PLC receiver 70 and is decoded into binary data and phase data by the PLC receiver in a conventional manner. The PLC receiver can operate by any of several well-known techniques including frequency shift keying, phase shift keying or modifications thereof. One successful embodiment in accordance with the present invention was operated using differential phase shift keying (DPSK). In this manner the powerline carrier signal is decoded to binary data and phase data by the PLC receiver. The binary data is then fed into the input of the shift register 72, and the phase data into the input of the clock extractor 71. Each ballast in a system of numerous ballasts which can be addressed from a central control or a plurality of central control stations may be given an unique identification address in the total system. The binary data is fed into the input of the shift register which, in turn, is clocked by a signal from the clock extractor 71. The shift register 72 has parallel outputs which are connected into the address and framing recognition apparatus 73. When a match occurs in the string of binary data received by the PLC receiver which is identified by the address and frame recognition block as being a transmission addressed to that particular ballast an output from the address and framing recognition apparatus 73 in the form of an address match signal activates the data latch 74 such that the associated control signal may be transmitted from the shift register through the data latch to the output device 75. The output device 75 is in the form of a digital-to-analog converter which provides an analog output corresponding to the desired light level. This may be in the form of an adjustment in the analog setpoint of $V_{sp}$ to control the brightness of the associated lamps, and/or start or stop signals to turn the lamp ON and OFF. Of course, when the system is in the ON mode, the analog setpoint signal $V_{sp}$ is maintained at a steady state unless changed by an additional input signal from the powerline carrier system.

It can be appreciated from the above description of the present invention that the entire system may be provided in a low-cost two-wire ballast system, which may be plugged in or wired into a conventional line voltage system as is the case with the ordinary core-coil systems used in most present installations. Upon the installation of the powerline carrier or other remote, wireless signalling system, the total fluorescent illumination of the installation may be controlled without the necessity to run any additional wiring in the building or add additional intermediate devices.

The embodiments of the invention in which an exclusive property or right is claimed are defined as follows:

1. A remotely controlled dimming solid state ballast system for gas discharge lamps adapted to respond to external wireless control signals comprising:
   - solid state dimming ballast for powering one or more of said lamps, said solid state dimming ballast including control interface means for interfacing with an external wireless control system;
   - control means for controlling said ballast means said control means further comprising,
     - signal receiving means including decoding means for receiving and decoding remotely transmitted control signals,
     - signal recognition means connected to said decoding means for recognizing control signals addressed to said ballast,
     - enabling means associated with said signal recognition means for allowing transmission of recognized control signals to an output means, and
     - output means for generating a setpoint output control signal modulated in response to said recognized control signals and indicative of the desired control setpoint of said one or more lamps controlled by said ballast, wherein said output means is connected between said enabling means and said ballast.

2. The apparatus according to claim 1 wherein said control means has a unique address and wherein said signal recognition means further comprises:
   - intermediate data receiving and transmitting means for receiving and selectively transmitting address and control signal data;
   - address and framing recognition means including;
     - means for receiving address data from said intermediate data receiving and transmitting means,
     - means for recognizing a control signal address matching said unique address, and
     - recognition output means connected to said enabling means for activating said enabling means upon the matching of said unique address.

3. The apparatus of claim 2 wherein said enabling means is a data latch.

4. The apparatus according to claim 1 wherein said output device further comprises a plurality of output signals including one or both of START and STOP outputs to control the starting and/or shutting down of the ballast.

5. The apparatus according to claim 1 wherein said output means is a digital-to-analog converter and wherein said output control signal is an analog signal having a value related to the desired lamp light level.

6. The apparatus according to claim 4 wherein said output means is a digital-to-analog converter and wherein said output control signal is an analog signal having a value related to the desired lamp light level.

7. The apparatus according to claim 5 wherein said analog signal is DC.

8. The apparatus according to claim 6 wherein said analog signal is DC.

9. The apparatus according to claim 1 wherein said signals received by said signal receiving means are in the form of binary digital data.

10. The apparatus according to claim 5 wherein said data is transmitted and decoded using a mode selected from the group consisting of frequency shift keying, phase shift keying and differential phase shift keying.

11. The apparatus according to claim 10 wherein said mode is differential phase shift keying.

12. The apparatus according to claim 1 wherein said signal received by said receiver are powerline carrier signals.

13. The apparatus according to claim 11 wherein said signals received by said signal receiving means are in the form of binary digital data.

14. The apparatus according to claim 12 wherein said data is transmitted and decoded using a mode selected from the group consisting of frequency shift keying, phase shift keying and differential phase shift keying.

15. The apparatus according to claim 14 wherein said mode is differential phase shift keying.

16. The apparatus according to claim 1 wherein said control interface means of said ballast means further comprises:

monitor means for monitoring a parameter indicative of the lamp current which is proportional to light intensity level of said lamps ($V_{avg}$), said monitor means further comprising:

first signal generating means for generating an output signal, $V_{avg}$, indicative of the status of said light level of said lamps;

second signal generating means having an input connected to the output of said first signal generating means and another input connected to said setpoint output of said output means, wherein said second signal generating means generates an output signal indicative of any difference between said input signals; and modulation means for modulating said light level of said second signal generating means in a manner which causes said output of said first signal generating means signal to conform to said setpoint signal.

17. The apparatus according to claim 16 wherein both said lamp status signal and said setpoint signal are analog DC signals.

18. The apparatus according to claim 17 wherein said second signal generating means is an operational amplifier.

19. The apparatus according to claim 16 wherein said status signal is derived from the average current level of said one or more lamps.

20. The apparatus according to claim 19 wherein said monitor means further comprises:

current transformer means having at least one primary winding connected to the lamp current and a secondary winding;

full-wave rectifier means connected across said secondary winding of said current transformer means, said full-wave rectifier means generating said analog status signal.

21. The apparatus according to claim 20 wherein said ballast controls dual lamps and wherein said current transformer further comprises dual primary windings wound oppositely to null out the cathode filament current thereby transmitting only the lamp current.

22. The apparatus according to claim 16 wherein said ballast further comprises:

an inverter means driven by variable pulse width square wave electric power, and means for modulating the pulse width of said variable pulse width square wave electric power in response to the output signal of said second signal generating means of said control interface means.

23. The apparatus according to claim 4 wherein said control interface means of said ballast further comprises:

a power supply means adapted to drive an inverter means, wherein said power supply means includes an oscillating circuit means which requires an external START signal;

and wherein said output means of said control means provides said start-up signal in the form of a timed pulse of DC voltage upon receiving an START control signal from said enabling means, said START output from said output means being connected to the oscillator drive input of said ballast control means.

24. The apparatus according to claim 4 wherein said control interface means of said ballast further comprises:

a power supply means adapted to drive an inverter means, wherein said power supply means includes an oscillating circuit means which requires an external signal to turn said power supply off;

and wherein said output means of said control means provides said OFF signal in the form of a timed pulse of DC voltage upon receiving an OFF control signal from said enabling means, said OFF output from said output means being connected to a STOP input to the oscillator drive input of said ballast control means.

25. The apparatus according to claim 1 wherein said signal receiving means is a radio frequency receiver.

26. The apparatus according to claim 1 wherein said signal receiving means is an ultrasonic receiver.

27. The apparatus according to claim 1 wherein said control interface means of said ballast further comprises:

a power supply means adapted to drive an inverter means, wherein said power supply means includes an oscillating circuit means which requires an external signal to turn said power supply off;

and wherein said output means of said control means provides said OFF signal in the form of a timed pulse of DC voltage upon receiving an OFF control signal from said enabling means, said OFF output from said output means being connected to a STOP input to the oscillator drive input of said ballast control means.

28. The apparatus according to claim 1 wherein said signal receiving means is an optical receiver.

29. The apparatus according to claim 1 wherein said signal receiving means is a fiber-optic receiver.

* * * * *